United States Patent

Nagai

[11] Patent Number: 5,819,280
[45] Date of Patent: *Oct. 6, 1998

[54] DATA STRUCTURE DETERMINING METHOD FOR HIERARCHICALLY STRUCTURED DATA CORRESPONDING TO IDENTIFIERS AND APPARATUS THEREOF

[75] Inventor: Tsuyoshi Nagai, Shizuoka, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 593,821

[22] Filed: Jan. 30, 1996

[30] Foreign Application Priority Data

Apr. 4, 1995 [JP] Japan .................................. 7-079165

[51] Int. Cl.⁶ .................................................. G06F 17/30
[52] U.S. Cl. ........................ 707/103; 707/100; 707/101; 707/102
[58] Field of Search .................................... 395/613, 611, 395/800; 364/200, 300; 707/101, 102, 103, 100

[56] References Cited

U.S. PATENT DOCUMENTS

| | | | |
|---|---|---|---|
| 4,468,728 | 8/1984 | Wang | 364/200 |
| 4,554,631 | 11/1985 | Reddington | 364/300 |
| 4,606,002 | 8/1986 | Waisman et al. | 364/200 |
| 4,611,272 | 9/1986 | Lomet | 364/200 |
| 5,093,919 | 3/1992 | Yoshida et al. | 395/800 |
| 5,404,512 | 4/1995 | Powers et al. | 707/3 |
| 5,497,344 | 3/1996 | Okamoto | 395/800 |
| 5,600,826 | 2/1997 | Ando | 395/611 |

FOREIGN PATENT DOCUMENTS 0 375 307 6/1990 European Pat. Off. .............. 15/40

*Primary Examiner*—Thomas G. Black
*Assistant Examiner*—Frantz Coby
*Attorney, Agent, or Firm*—Staas & Halsey

[57] ABSTRACT

A structure of hierarchically structured data including two or more data pieces having a hierarchical relationship is determined. An identifier is added to a data piece that is an element of the hierarchically structured data. The method determines whether or not there are two or more data pieces with the same identifier as the identifier of a first data piece, in a hierarchical data sequence composed of the first data piece and a second data piece placed below the first data piece, determines that an infinite hierarchical structure takes place when there are two or more data pieces with the same identifier if the second data piece is placed below the first data piece, and determines that an infinite hierarchical structure does not take place when there are not two or more data pieces with the same identifier, even if the second data piece is placed below the first data piece. Corresponding to the determined result, the data placement that results in an occurrence of an infinite hierarchical structure can be prevented.

21 Claims, 14 Drawing Sheets

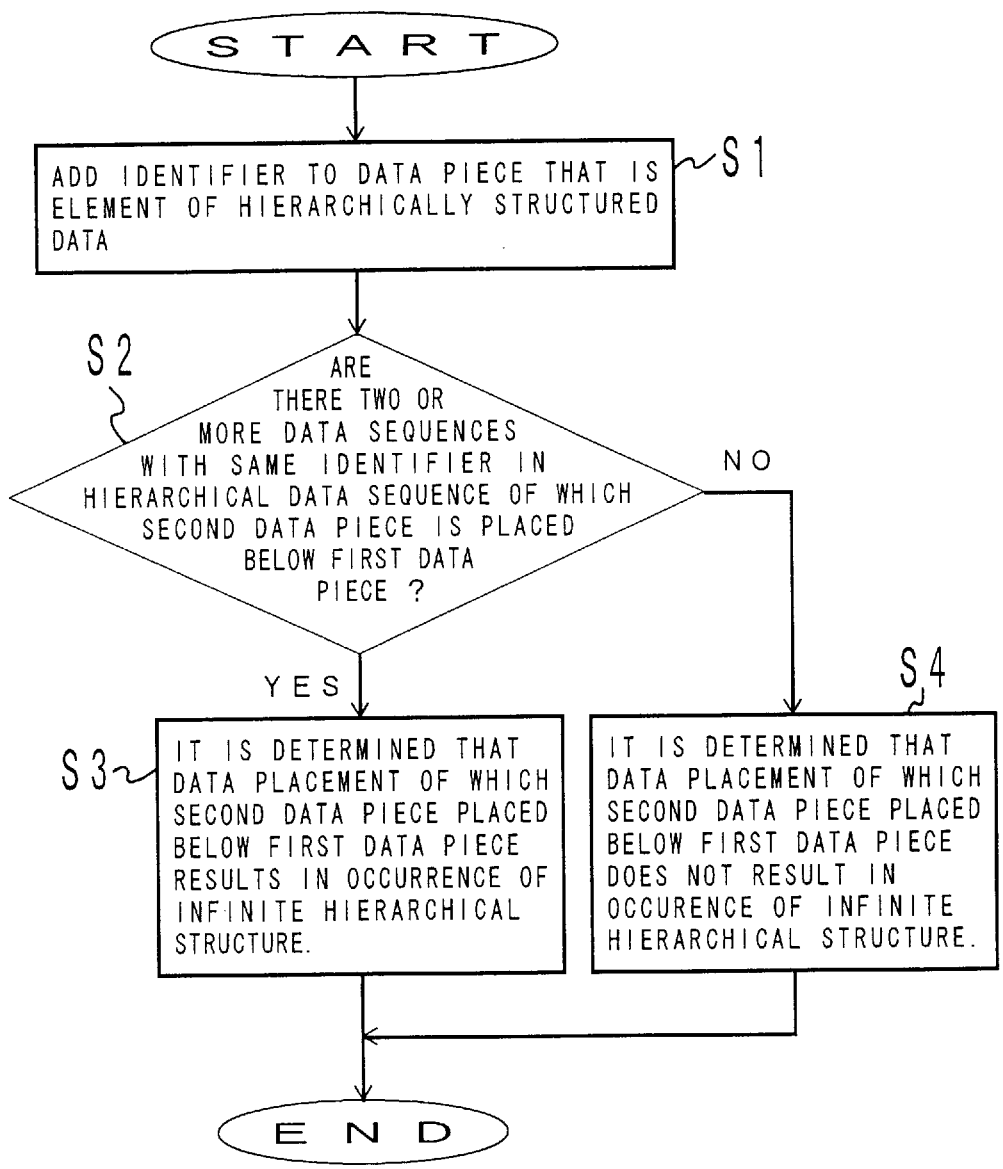
F I G. 5

|  | IDENTIFIER | CHILD POINTER | PRE-POINTER | POST-POINTER |
|---|---|---|---|---|
| GROUP α | 1 | MEMBER a | MEMBER c | — |
| GROUP β | 2 | MEMBER b | — | — |
| MEMBER a | 3 | — | — | — |
| MEMBER b | 4 | — | — | MEMBER c |
| MEMBER c | 5 | — | MEMBER b | GROUP α |

FIG. 10

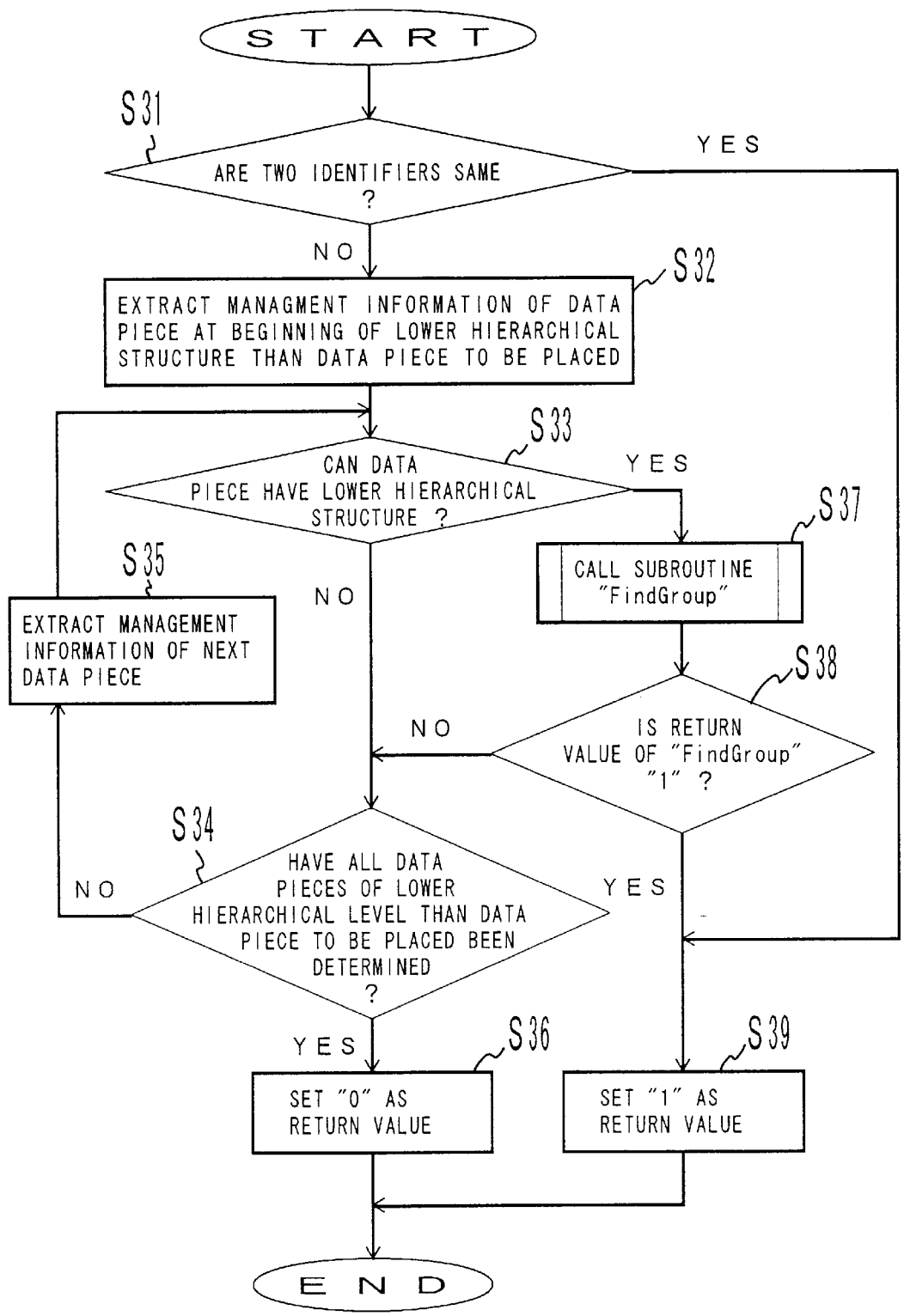
F I G. 1 2

DATA STRUCTURE DETERMINING METHOD FOR HIERARCHICALLY STRUCTURED DATA CORRESPONDING TO IDENTIFIERS AND APPARATUS THEREOF

BACKGROUND OF THE INVENTION

1. Field of the Invention

The present invention relates to a data structure determining method for hierarchically structured data that is managed corresponding to a chain and into which a data piece, is placed and an apparatus thereof.

2. Description of the Related Art

A data management method that correlates a plurality of data pieces is known for an information processing apparatus. In this method, hierarchically structured data composed of several data pieces having a hierarchical relationship is managed corresponding to a chain that links data pieces.

FIG. 1 is a schematic diagram showing such hierarchically structured data. The hierarchically structured data shown in FIG. 1 is composed of data pieces $\alpha$, $\beta$, $\gamma$, A, and B. The data pieces $\alpha,\beta$, and $\gamma$ have lower hierarchical data structures. On the other hand, the data pieces A and B do not have lower hierarchical data structures. Although the data piece A is placed in lower hierarchical levels than the data pieces $\alpha$ and $\beta$, since the hierarchically structured data is managed corresponding to a chain, the number of substantial data pieces is one. When the hierarchy is managed corresponding to the chain, the same data piece can be accessed from a plurality of positions of the hierarchical structure as a benefit. However, when a new data piece is added to a new hierarchical relation applied to the hierarchically structured data, an infinite hierarchical structure may or may not take place.

FIG. 2 is a schematic diagram showing an example in the case that when a data piece is placed in the hierarchically structured data shown in FIG. 1, an infinite hierarchical structure does not take place. In FIG. 2, the data piece $\beta$ is placed in the next hierarchical level lower than the data piece $\gamma$. The data piece $\gamma$ includes not only the data piece $\beta$, but the data pieces A and B.

On the other hand, FIG. 3 is a schematic diagram showing an example in the case that when a data piece is placed in the hierarchical structure shown in FIG. 1, an infinite hierarchical structure takes place. In FIG. 3, when a data piece $\alpha$ is placed in a lower hierarchical level than another data piece $\alpha$, the hierarchical chain is looped. Thus, an infinite hierarchical structure that repeats the data piece a takes place in a lower hierarchical level than the data piece $\alpha$.

The above-described conventional data processing method has the following problems. When all data pieces are retrieved from the infinite hierarchical structure shown in FIG. 3, since the same data structures composed of the data pieces $\alpha,\beta$, $\gamma$, A, and B are repeatedly placed in the lower hierarchical levels, the same substantial data pieces should be repeatedly retrieved. Thus, the process becomes complicated and thereby the processing speed decreases.

Even if data pieces with the same name are prohibited from being vertically linked, an infinite hierarchical structure may take place. For example, in FIG. 1 when the data piece $\alpha$ is placed below the data piece $\gamma$, an infinite hierarchical structure takes place. On the other hand, when a data piece is copied and a different name is designated thereto, if the copied data piece with the different name is placed below the original data piece, an infinite hierarchical structure also takes place. In this case, as with the case shown in FIG. 3, the data process becomes complicated.

SUMMARY OF THE INVENTION

An object of the present invention is to provide a data structure determining method and apparatus for determining whether or not an infinite hierarchical structure takes place in hierarchically structured data managed corresponding to a chain, so as to prevent a data process thereof from being complicated.

According to the present invention, an identifier for uniquely identifying a data piece that is an element of hierarchically structured data is added to the data piece. When a new data piece is added to hierarchically structured data, the identifiers of data pieces chained in the hierarchical structure and the identifier of a new data piece to be linked thereto are compared.

When an identifier in the hierarchical structure accords with the identifier of the new data piece, an infinite hierarchical structure takes place. When an identifier in the hierarchical structure does not accord with the identifier of the new data piece, an infinite hierarchical structure does not take place.

Thus, since the structure of the data managed corresponding to the chain can be automatically determined, an infinite hierarchical structure can be prevented from taking place when hierarchically structured data is processed. Thus, the hierarchical structure can be simplified and the speed of the data process can be increased.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 5 is an operating flow chart showing a data structure determining method according to an embodiment of the present invention;

FIG. 10 is a table showing an example of the data management information;

FIG. 12 is an operating flow chart showing a subroutine;

DESCRIPTION OF PREFERRED EMBODIMENTS

Next, with reference to the accompanying drawings, a data structure determining apparatus according to an embodiment of the present invention will be described.

Figure 1:
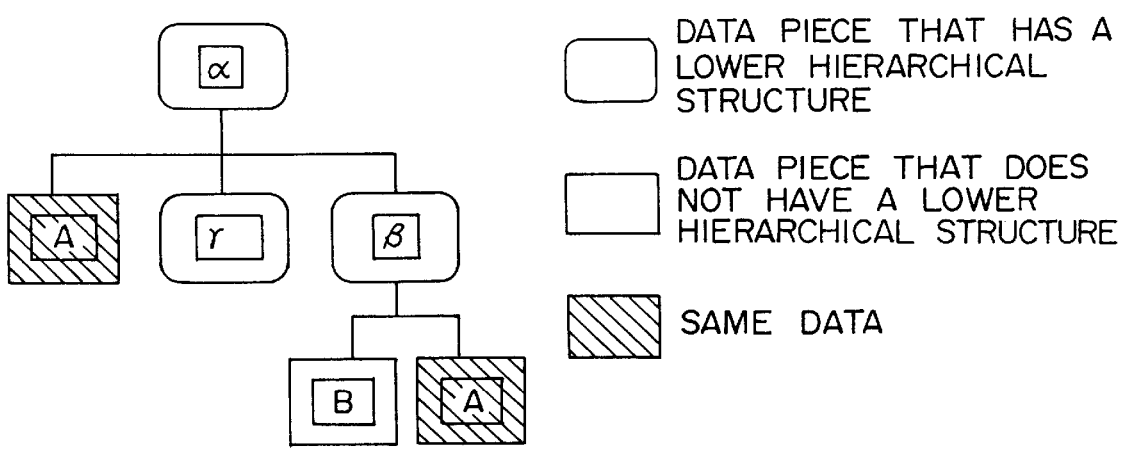
FIG. 1 is a schematic diagram showing an example of hierarchically structured data.
Figure 2:
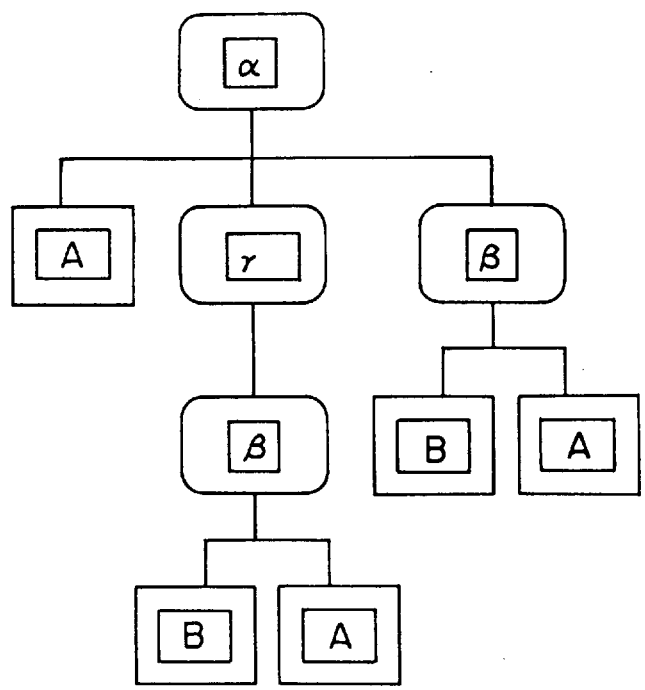
FIG. 2 is a schematic diagram showing an example in that case that a data placement does not result in an occurrence of an infinite hierarchical structure.
Figure 3:
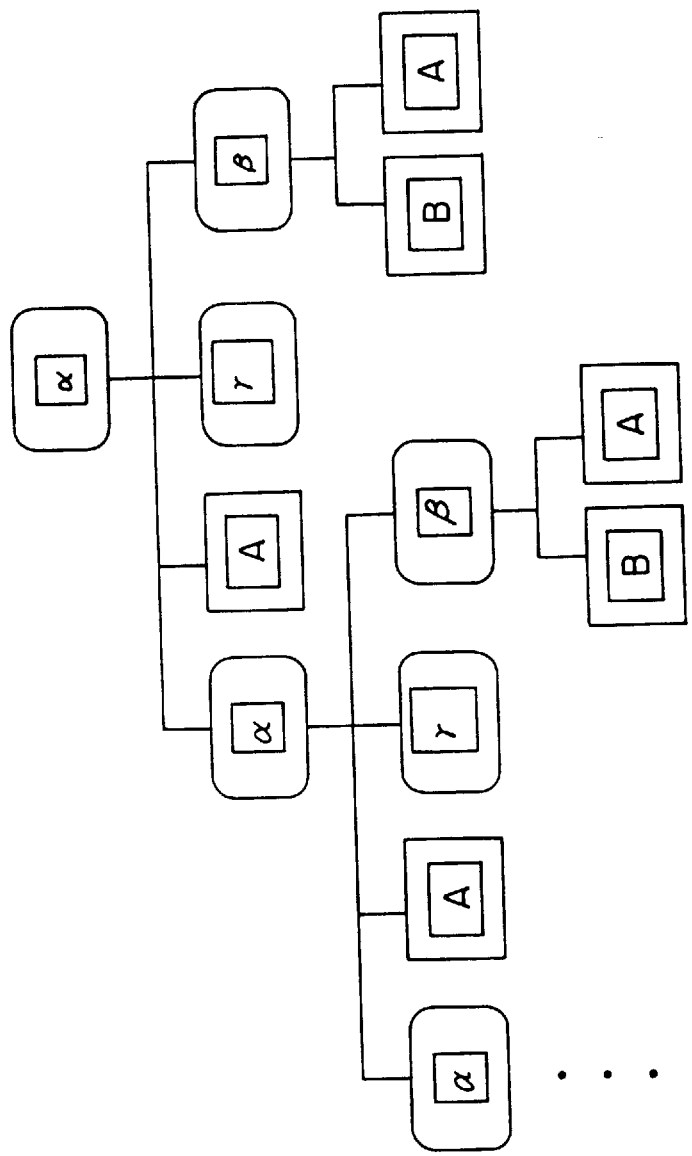
FIG. 3 is a schematic diagram showing an example in the case that a data placement results in an occurrence of an infinite hierarchical structure.
Figure 4:
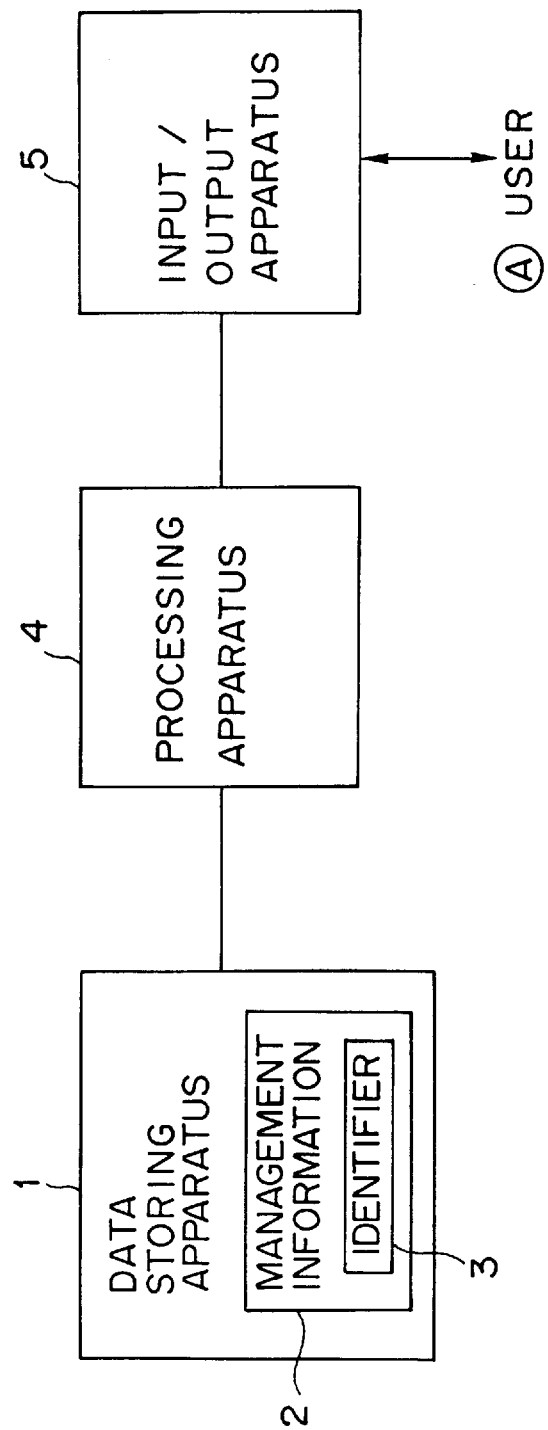
FIG. 4 is a block diagram showing the construction of a data structure determining apparatus according to an embodiment of the present invention.

FIG. 4 is a block diagram showing the configuration of a data structure determining apparatus according to an embodiment of the present invention.

In FIG. 4, a data storing apparatus 1 stores data pieces that are elements of hierarchically structured data. Data pieces stored in the data storing apparatus are designated identifiers 3 that uniquely identify them.

In addition, the data storing apparatus 1 stores management information 2 that correlates data pieces. The management information 2 includes, for example, pointers that represent other data pieces and identifiers 3.

A processing apparatus 4 determines whether or not a hierarchical data sequence composed of a first data piece and a second data piece placed below the first data piece includes two or more data pieces with the same identifier. When there are two or more data pieces with the same identifiers, the processing apparatus 4 determines that an infinite hierarchical structure takes place. On the other hand, when there are not two or more data pieces with the same identifier, the processing means 4 determines that an infinite hierarchical structure does not take place.

When the processing apparatus 4 has determined that an infinite hierarchical structure takes place, a input/output apparatus 5 prompts the user for a data placement in which the second data piece is placed below the first data piece, and receives a reply from the user.

When the input/output apparatus 5 receives a reply that represents that the user does not permit the data placement, the processing apparatus 4 does not place the second data piece below the first data piece.

When the input/output apparatus 5 receives a reply that represents that the user permits the data placement, the processing apparatus 4 places the second data below the first data.

FIG. 5 is a operating flow chart showing a data structure determining method according to an embodiment of the present invention.

In FIG. 5, the data structure determining method for hierarchically structured data composed of two or more data pieces having a hierarchical relationship is disclosed, that comprises the steps of adding an identifier 3 to a data piece that is an element of the hierarchically structured data (at step S1), determining whether or not there are two or more data pieces with the same identifier 3 as the identifier of the first data piece in a hierarchical data sequence composed of the first data piece and a second data piece placed below the first data piece (at step S2), determining that an infinite hierarchical structure takes place when there are two or more data pieces with the same identifier 3 if the second data piece is placed below the first data piece (at step S3), and determining that an infinite hierarchical structure does not take place when there are not two or more data pieces with the same identifier 3 even if the second data piece is placed below the first data piece (at step S4).

Thus, a data piece that is an element of hierarchically structured data has management information 2 that represents a hierarchical relationship between this data piece and another data piece. By processing the management information 2, the hierarchical relationship between these data pieces can be defined so as to place a new data piece in the hierarchical structure.

In this case, an identifier 3 that uniquely identifies a data piece is added thereto (at step S i). By comparing two identifiers 3, it can be easily determined whether or not two data pieces are substantially the same.

When the second data piece is placed below the first data piece and thereby a new hierarchical structure is generated, or when the second data piece is added to hierarchically structured data including the first data piece, identifiers 3 of a plurality of data pieces (data sequence) hierarchically placed in the vertical direction connecting the first data piece and the second data piece are determined (at step S2). When there are two or more data pieces with the same identifier 3 in the data sequence, since the chain thereof is looped, it is determined that a data placement results in an occurrence of an infinite hierarchical structure (at step S3). When there are not two or more data pieces with the same identifier 3 in the data sequence, it is determined that the data placement does not result in an occurrence of an infinite hierarchical structure (at step S4).

Corresponding to the determined result, when the data placement in which the second data piece is placed below the first data piece results in an occurrence of an infinite hierarchical structure, the data placement can be prohibited. Thus, the hierarchically structured data can be effectively processed.

Next, with reference to the accompanying drawings, an embodiment of the present invention will be described.

Figure 6:
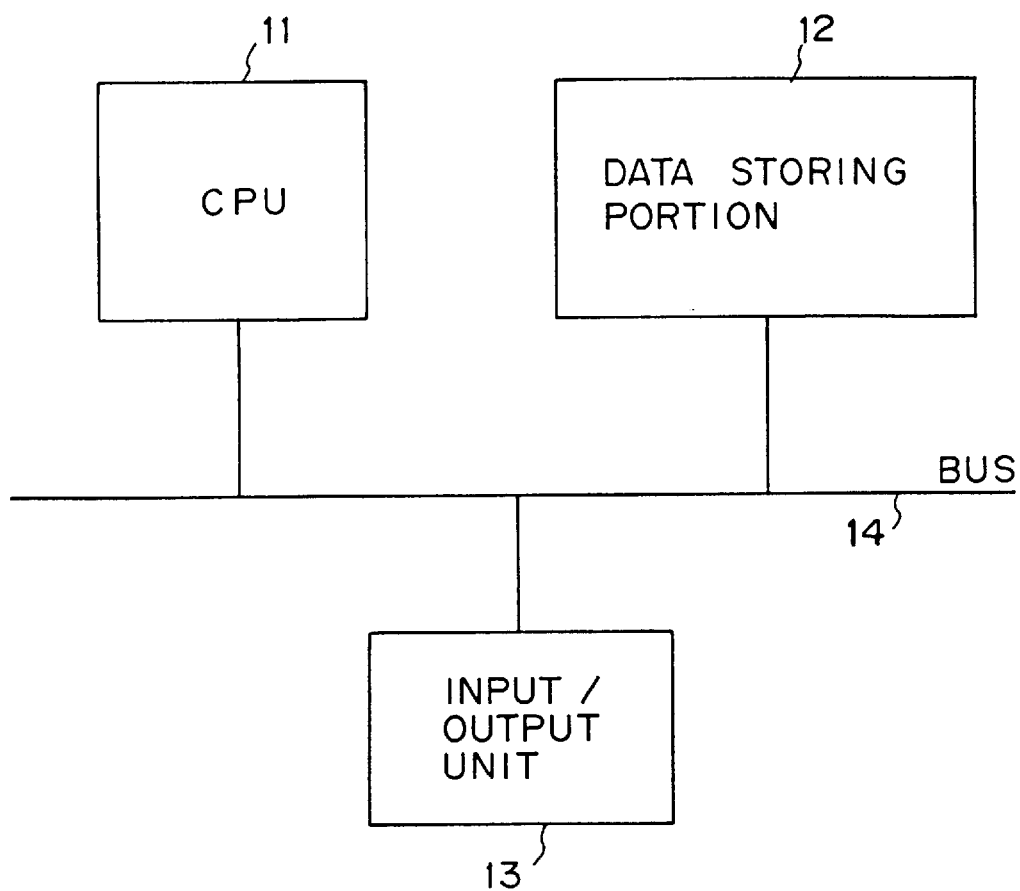
FIG. 6 is a block diagram showing the system construction of an embodiment of the present invention.

FIG. 6 is a block diagram showing the system construction of an information processing apparatus according to an embodiment of the present invention. The information processing apparatus shown in FIG. 6 comprises a CPU (central processing unit) 11, a data storing portion 12, an input/output unit 13, and a bus 14 that connects these constructional portions. The data storing portion 12 is a disc unit having, for example, a magnetic disc or an optical disc that stores individual data pieces that are elements of hierarchically structured data. A unique identifier 3 is added to each data piece so as to identify it. The input/output unit 13 is, for example, a display unit that has an input unit such as a keyboard. The input/output unit 13 receives a data processing command from the user and displays the processed result. The CPU 11 retrieves data from the data storing portion 12 corresponding to a data processing command received from the input/output unit 13 and processes the received data.

When the user issues a command that defines a hierarchical relationship among several data pieces, the CPU 11 stores a pointer that represents the hierarchical relationship in management information 2 of each data piece and generates hierarchically structured data. The hierarchically structured data is stored in the data storing portion 12.

When a hierarchical relationship is designated to data pieces and a data piece is placed in hierarchically structured data, the CPU 11 determines whether or not the new hierarchical relationship results in an occurrence of an infinite hierarchical structure. When necessary, the CPU 11 presents the determined result to the user through the input/output unit 3. When the user permits the data placement, the CPU 11 places the data piece in the hierarchically structured data.

Figure 7:
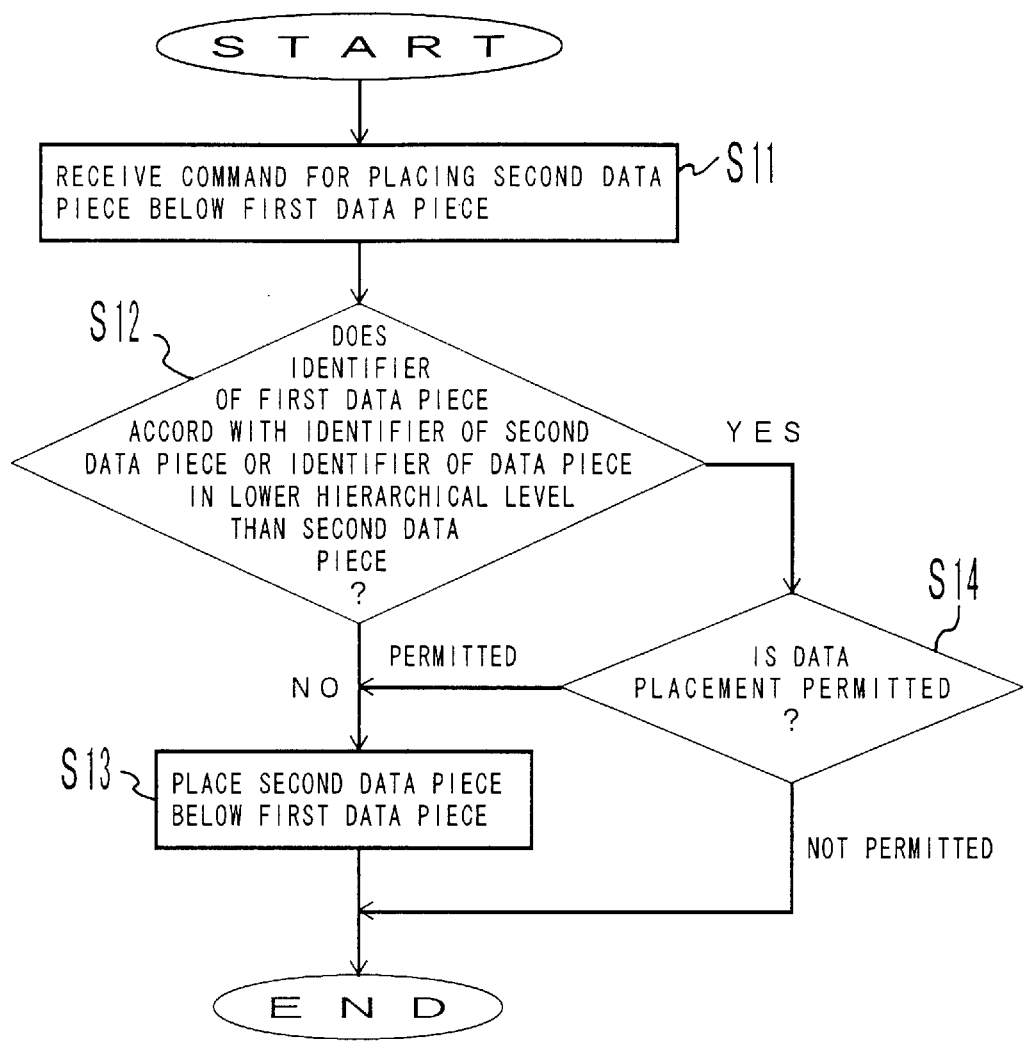
FIG. 7 is an operating flow chart showing a data placing process in a downward data retrieving operation.

FIG. 7 is an operating flow chart showing a process in which the CPU 11 retrieves hierarchically structured data in the direction of the lower hierarchical levels, determines the structure, and places a data piece in the structure. In FIG. 7, when the process is started, the CPU 11 receives a data placement command for placing a second data piece below a first data piece that compose hierarchically structured data, from the user (at step S11). Thereafter, it is determined whether or not the identifier 3 of the first data piece accords with the identifier 3 of the second data piece or the identifier 3 of a data piece in a lower hierarchical level than the second data piece (at step S12). When the identifier of the first data piece does not accord with the identifier 3 of the second data piece or the identifier 3 of a data piece in a lower hierarchical level than the second data piece, the CPU 11 places the second data piece below the first data piece (at step S13) and completes the process.

When the identifier 3 of the first data piece accords with the identifier 3 of the second data or the identifier 3 of a data piece in the lower hierarchical level than the second data piece, the CPU 11 informs the user of this situation through the input/output unit 3 and prompts the user for a reply (at step S14). If the user permits the data placement, the CPU 11 places the second data piece below the first data piece (at step S13). When the user does not permit the data placement, the CPU 11 terminates the process.

When there is a data piece with the same identifier 3 as the first data piece in a lower hierarchical level than the second data piece, if a data piece with the same identifier 3 is placed in the hierarchical structure, the same data structure is repeated in the hierarchical relationship and thereby an infinite hierarchical structure takes place. In the data placing process shown in FIG. 7, in such a case, the user can prohibit the data piece from being placed.

Next, with reference to FIGS. 8 to 12, a practical example of the data placing process will be described.

Figure 8:
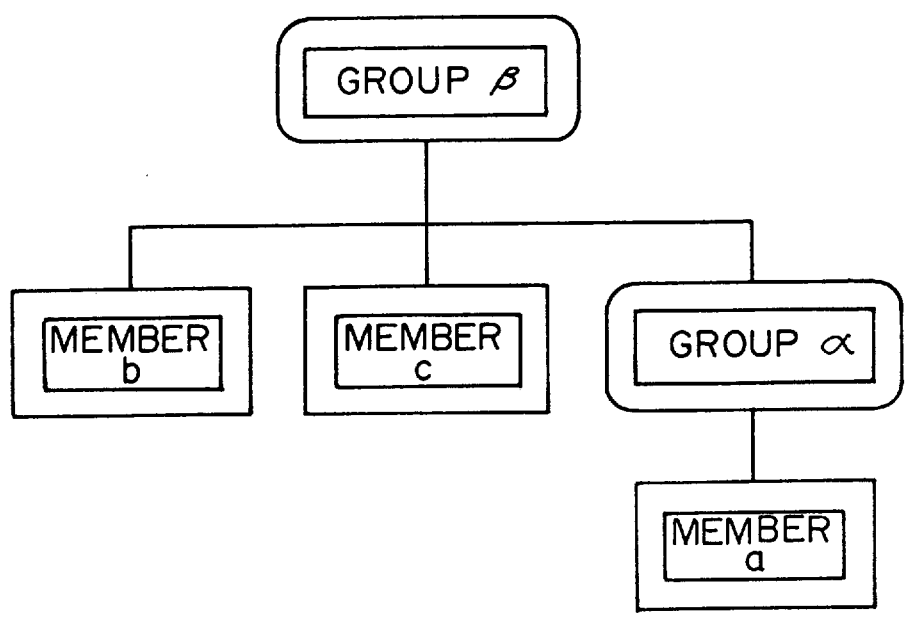
FIG. 8 is a schematic diagram showing a hierarchically structured data according to an embodiment of the present invention.

FIG. 8 is a schematic diagram showing a practical example of hierarchically structured data into which a data piece has not been placed. In FIG. 8, groups $\alpha$ and $\beta$ are data pieces having lower hierarchical structures. Members a, b, and c are data pieces that do not have lower hierarchical structures. The members b and c and the group $\alpha$ are placed below the group $\beta$. The member a is placed below the group $\alpha$.

Figure 9:
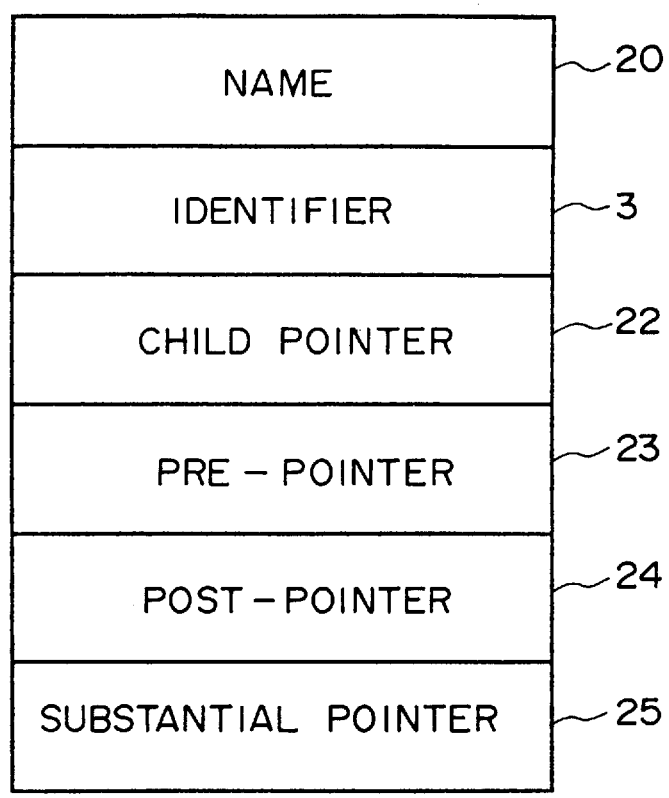
FIG. 9 is a schematic diagram showing the format of data management information.

FIG. 9 is a schematic diagram showing the format of management information 2 designated for each of the data pieces shown in FIG. 8. FIG. 10 is a table showing the content of the management information 2 of each of the data pieces shown in FIG. 8. The management information 2 of these data pieces is stored in the data storing portion 12.

In FIG. 9, a name 20 is the name of a data piece. An identifier 3 is a number that uniquely identifies a data piece. A child pointer 22 is a pointer that represents management information 2 of a data piece in a lower hierarchical level than the data piece of the child pointer 22. When the data piece of the child pointer 22 does not have a lower hierarchical structure, the child pointer 22 does not represent the management information 2 of any data piece. A pre-pointer 23 is a pointer that represents management information 2 of a data piece that precedes the current data piece in the same hierarchical level. When the data piece of the pre-pointer 23 is placed at the beginning of the same hierarchical level, the pre-pointer 23 does not represent the management information 2 of any data piece. A post-pointer 24 is a pointer that represents management information 2 of a data piece that follows the current data piece in the same hierarchical level. When the data piece of the post-pointer 24 is placed at the end of the same hierarchical level, the post-pointer 24 does not represent the management information 2 of any data piece. A substantial pointer 25 is a pointer that represents the substance of data (substantial data).

In the case of the hierarchically structured data shown in FIG. 8 and as shown in FIG. 10, the value of the identifier 3 of the group $\alpha$ is "1". The child pointer 22 of the group a represents the management information 2 of the member a. The pre-pointer 23 of the group $\alpha$ represents the management information 2 of the member c. The post-pointer 24 of the group $\alpha$ does not represent the management information 2 of any data piece. The value of the identifier 3 of the group $\beta$ is "2". The child pointer 22 of the group $\beta$ represents the management information 2 of the member b. The pre-pointer 23 and the post-pointer 24 of the group $\beta$ does not represent the management information 2 of any data piece. The value of the identifier 3 of the member a is "3". The child pointer 22, the pre-pointer 23, and the post-pointer 24 of the member a do not represent the management information 2 of any data piece. The value of the identifier 3 of the member b is "4". The child pointer 22 and the pre-pointer 23 of the member b do not represent the management information 2 of any data piece. The post-pointer 24 of the member b represents the management information 2 of the member c. The value of the identifier 3 of the member c is "5". The child pointer 22 of the member c does not represent the management information 2 of any data piece. The pre-pointer 23 of the member c represents the management information 2 of the member b. The post-pointer 23 of the member c represents the management information 2 of the group $\alpha$.

Figure 11:
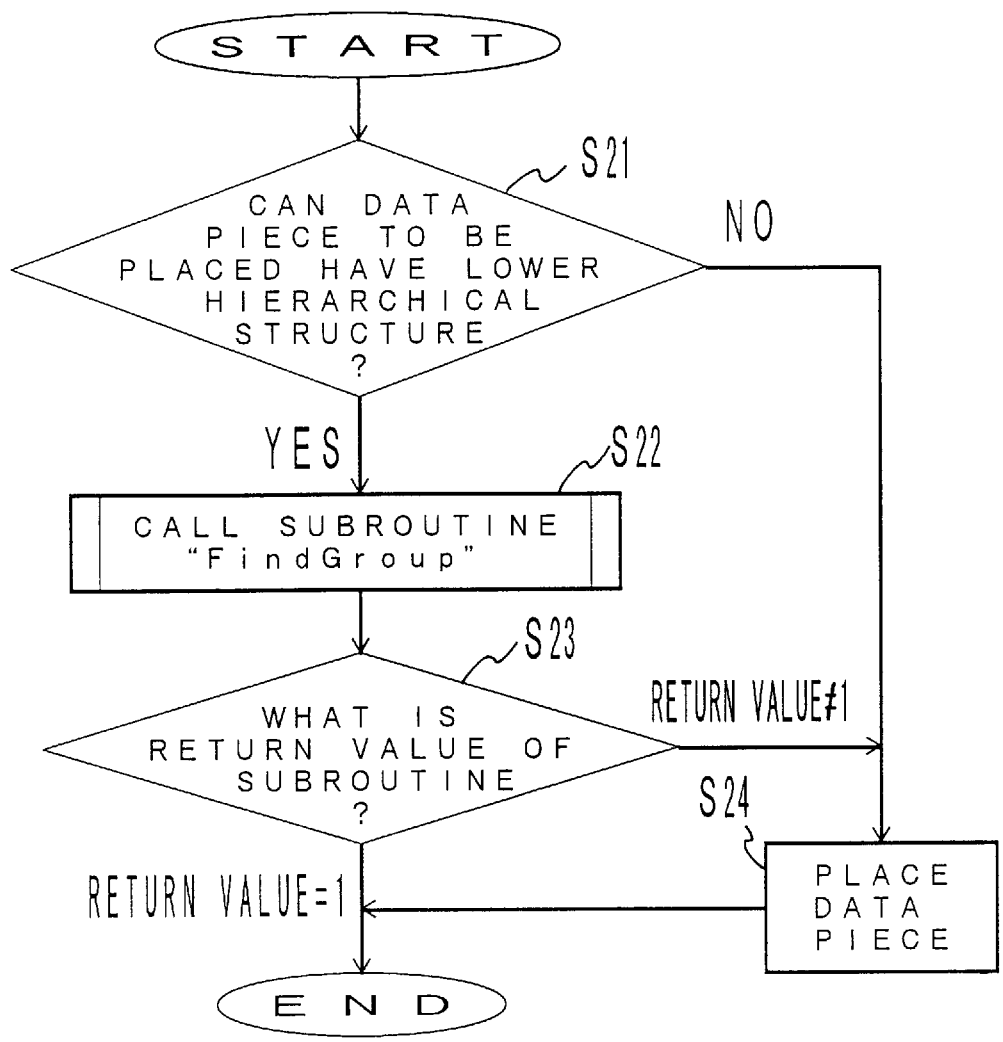
FIG. 11 is a detailed operating flow chart showing a data placing process.

FIG. 11 is a detailed operating flow chart showing a data placing process performed by the CPU 11. FIG. 12 is an operating flow chart showing a subroutine process called at step S22 of FIG. 11. The CPU 11 performs the process in the following order.

The CPU 11 determines whether or not a data piece to be placed can have a lower hierarchical structure (namely, whether or not the child pointer 22 of the management information 2 of the data piece to be placed represents the another data piece) (at step S21). When the data piece to be placed can have a lower hierarchical structure, a subroutine FindGroup is called with arguments of the management information 2 of the data piece of the hierarchically structured data (destination data piece) and the management information 2 of the data piece to be placed (at step S22).

When a command for placing the group $\beta$ below the group $\alpha$ is issued in the hierarchically structured data as shown in FIG. 8, it is determined whether or not the group $\beta$ can have a lower hierarchical structure (at step S21). Since the child pointer 22 of the management information 2 of the group $\beta$ shown in FIG. 10 represents the member b, it is clear that the group $\beta$ is a data piece that can have a lower hierarchical structure. Thus, the subroutine FindGroup is called with the management information 2 of the group $\alpha$ and the management information 2 of the group $\beta$ (at step S22).

The subroutine FindGroup retrieves the lower hierarchical structure of the data piece to be placed corresponding to the management information 2 of the destination data piece and the management information 2 of the data piece to be placed received as arguments, and determines whether or not there is a data piece with the same identifier 3 as the source data piece identifier 3. When a data piece with the same identifier 3 is detected, a value "1" is returned.

Next, the return value of the subroutine FindGroup is determined (at step S23). When the return value is not "1", the data piece is placed below the destination data piece (at step S24). Thereafter, the process is terminated. When the return value is "1", it represents that an infinite hierarchical structure takes place. When the return value is not "1", it represents that an infinite hierarchical structure does not take place.

When the data piece to be placed cannot have a lower hierarchical structure is determined at step S22, since a data structure is not repeated after the data piece to be placed (at step S24), the process is completed. For example, when the data piece to be placed is one of the members a, b, and c, since these data pieces cannot have lower hierarchical structures, the data piece is placed below the destination data piece.

Next, the process of the subroutine FindGroup shown in FIG. 12 will be described.

First, the identifiers 3 are extracted from the management information 2 received as arguments. Thereafter, these identifiers 3 are compared (at step S31). When both the identifiers 3 are the same, "1" is set as the return value(at step S39). Next, the process is terminated.

When the identifiers 3 are not the same, the management information 2 of a data piece at the beginning of the lower hierarchical level than the data piece to be placed is extracted (at step S32). It is determined whether or not the retrieved data piece can have a lower hierarchical structure (at step S33). When the extracted data piece cannot have a lower hierarchical structure, it is determined whether or not all data pieces in the lower hierarchical structure of the data piece to be placed have been determined (at step S34). When there is a data piece that has not been determined in the same hierarchical level of the data piece to be placed, the management information 2 thereof is extracted (at step S35) and the process after step S33 is repeated. When it has been determined that all data pieces in the lower hierarchical level than the data piece to be placed cannot have lower hierarchical structures, "0" is set as the return value (at step S36) and then the process is completed.

When the data piece to be placed can have a lower hierarchical structure as the determined result at step S33, the subroutine FindGroup is recursively called with the management information 2 of the destination data piece received as an argument and the management information 2 of the extracted data piece as an argument (at step S37). Thereafter, the return value of the recursively called subroutine FindGroup is determined (at step S38). When the return value is "1", "1" is set as the return value of the calling subroutine FindGroup (at step S39) and then the process is terminated. When the return value of the recursively called subroutine FindGroup is not "1", the process after step S34 is performed.

When the subroutine FindGroup is called with the management information 2 of the group α and the management information 2 of the group β as arguments at step S22 shown in FIG. 11, the identifier 3 of the group α and the identifier 3 of the group β are compared (at step S31). Since the values of the identifiers 3 of the groups α and β are 1 and 2, respectively, as shown in FIG. 10, the management information 2 of the member b at the beginning of the lower hierarchical level than the group β that is a data piece to be placed is extracted (at step S32).

Thereafter, it is determined whether or not the member b can have a lower hierarchical structure (at step S33). Since the management information 2 of the member b does not store the child pointer 22 and thereby the member b cannot have a lower hierarchical structure, it is determined whether or not all data pieces in the lower hierarchical level than the group β have been determined (at step S34). This determination is performed by checking whether or not the post-pointer 24 of the member b represents the any data piece. Since the post-pointer 24 of the member b represents the member c, it is clear that there is the member c that has not been determined in the lower hierarchical level than the group β. Thus, the management information 2 of the member c is extracted (at step S35).

Thereafter, it is determined whether or not the group α can have a lower hierarchical structure (at step S33). The child pointer 22 of the group α represents the member a. Thus, since the group α can have a lower hierarchical structure, the subroutine FindGroup is recursively called with the management information 2 of the group α received as an argument and the extracted management information 2 of the group α as an argument (at step S37). The recursively called subroutine FindGroup extracts the identifiers 3 from the management information 2 and compares the identifiers 3 (at step S31). In this case, since both the management information 2 are for the group α, the values of the identifiers 3 are "1". Thus, since the values of the two identifiers 3 are the same, the value "1" is returned to the calling subroutine FindGroup (at step S39).

On the other hand, since the return value of the first called subroutine FindGroup is "1" (at step S38), "1" is set as the return value (at step S39). Thereafter, the control is returned to the calling data placing process.

Since the return value of the first called subroutine FindGroup is "1" (at step S23), the process for placing the group β below the group α is not performed (namely, the process is terminated). Thus, the process for placing the group β that has a lower hierarchical structure of the group α below the group α is prohibited and thereby an occurrence of an infinite hierarchical structure can be prevented.

In FIG. 11, when the return value of the subroutine FindGroup is "1" at step S23, the data placing process is always prohibited. However, with the same step as step S14 shown in FIG. 7, the user may be prompted for the data placement. Thus, the user can permit an infinite hierarchical structure.

In the above-described embodiment, the management information 2 of a data piece in a lower hierarchical level is extracted with the child pointer 22 of the management information 2 of another data piece. The data structure can be determined corresponding to the values of the identifiers 3. However, when the management information 2 has information that represents the parent of the data piece (namely, in a higher hierarchical level than the data piece), the management information 2 of each parent can be successively extracted so as to determine the data structure.

Figure 13:
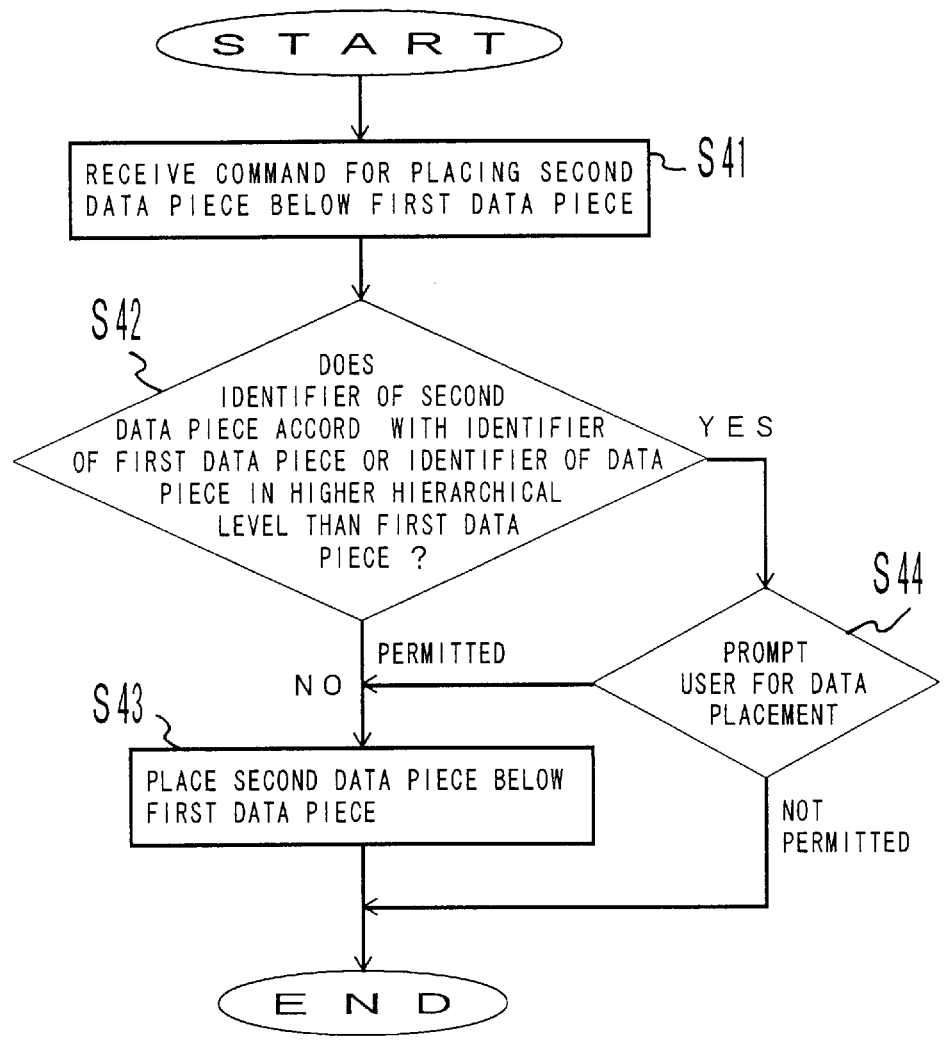
FIG. 13 is an operating flow chart showing a data placing process in a upward data retrieving operation.

FIG. 13 is an operating flow chart showing a process in which the CPU 11 upwardly retrieves hierarchically structured data, determines the structure, and places a data piece therein. In FIG. 13, when the process is started, the CPU 11 receives a command for placing a second data piece below a first data piece that composes hierarchically structured data from the user (at step S41). Thereafter, the CPU 11 determines whether or not the identifier 3 of the second data piece accords with the identifier 3 of the first data piece or the identifier 3 of a data piece in a higher hierarchical level than the first data piece (at step S42). When these identifiers 3 do not accord, the CPU 11 places the second data piece below the first data piece (at step S43) and completes the process.

When the identifier 3 of the second data piece accords with the identifier 3 of the first data piece or the identifier 3 of a data piece in a higher hierarchical level than the first data piece, the CPU 11 informs the user of this situation through the input/output unit 13 so as to prompt the user for the data placement (at step S44). When the user permits the data placement, the CPU 11 places the second data piece below the first data piece (at step S43). When the user does not permit the data placement, the CPU 11 terminates the process.

When there is a data piece with the same identifier 3 as the identifier 3 of the second data piece (which is a data piece to be placed) in the same hierarchical level or a higher hierarchical level than the first data piece (that is a destination data piece), if the CPU 11 places the data piece, the same data structure is repeated in the hierarchical structure and thereby an infinite hierarchical structure takes place. In the data placing process shown in FIG. 13, the user can prohibit the data piece from being placed in the hierarchical structure.

Figure 14:
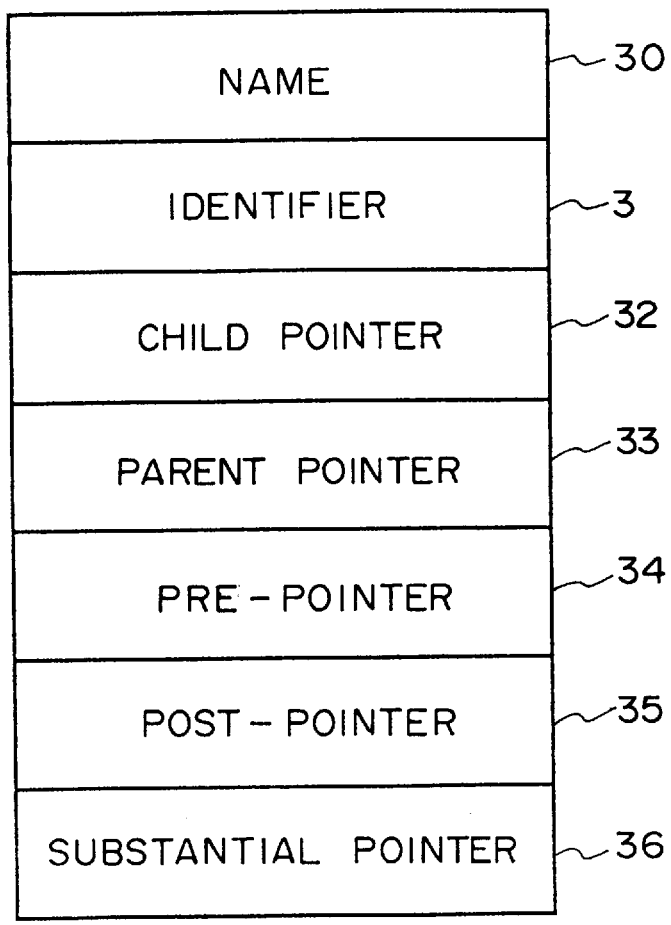
FIG. 14 is a schematic diagram showing the format of management information of a data piece having a parent pointer.

FIG. 14 is a schematic diagram showing the format of the management information 2 in the case that the CPU 11 performs the data placing process shown in FIG. 13. In FIG. 14, a name 30, an identifier 3, a child pointer 32, a pre-pointer 34, a post-pointer 35, and a substantial pointer 36 are the same as those shown in FIG. 9. A parent pointer 33 is a pointer that represents the management information 2 of the parent data of the data piece. In the case of a data piece in the highest hierarchical level (in the root), the parent pointer 33 does not represent the management information of any data piece. By successively processing the parent pointer 33 of each data piece, the CPU 11 can extract the management information 2 of a data piece in a higher hierarchical level than the destination data piece.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A data structure determining method for hierarchically structured data including two or more data pieces having a hierarchical relationship, comprising the steps of:

adding an identifier to a data piece that is an element of the hierarchically structured data;

determining whether or not there are two or more data pieces with the same identifier in a hierarchical data sequence including a first data piece and a second data piece placed below the first data piece, by retrieving data pieces in different hierarchical levels and comparing identifiers of the data pieces in the different hierarchical levels; and determining that an infinite hierarchical structure takes place when there are two or more data pieces with the same identifier if the second data piece is placed below the first data piece.

2. The data structure determining method as set forth in claim 1, further comprising the steps of:

prohibiting the second data piece from being placed below the first data piece when it has been determined that an infinite hierarchical structure takes place; and permitting the second data piece to be placed below the first data piece when it has been determined that an infinite hierarchical structure does not take place.

3. The structure determining method as set forth in claim 1, further comprising the steps of:

determining whether or not an identifier of the second data piece accords with an identifier of the first data piece or an identifier of a data piece in a higher hierarchical level than the first data piece; and determining that an infinite hierarchical structure takes place when the identifier of the second data piece accords with the identifier of the first data piece or an identifier of a data piece in a higher hierarchic level than the first data piece.

4. The data structure determining method as set forth in claim 1, further comprising the steps of:

determining whether or not an identifier of the first data piece accords with an identifier of the second data piece or an identifier of a data piece in a lower hierarchical level than the second data piece; and determining that an infinite hierarchical structure takes place when the identifier of the first data piece accords with the identifier of the second data piece or the identifier of a data piece in a lower hierarchical level than the second data piece.

5. The data structure determining method as set forth in claim 4, further comprising the steps of:

determining whether or not the second data piece can have a third data piece in a lower hierarchical level than the second data piece;

determining whether or not the identifier of the first data piece accords with the identifier of the second data piece or the identifier of a data piece in a lower hierarchical level than the second data piece when the second data piece can have a third data piece; and determining that an infinite hierarchical structure does not take place when the second data piece cannot have a third data piece.

6. The data structure determining method as set forth in claim 5, further comprising the steps of:

determining whether or not the third data piece can have a fourth data piece in a lower hierarchical level than the third data piece when the identifier of the first data piece does not accord with the identifier of the second data piece;

determining whether or not the identifier of the first data piece accords with the identifier of the third data piece or the identifier of a data piece in a lower hierarchical level than the third data piece when the third data piece can have a fourth data piece; and determining that an infinite hierarchical structure takes place when the identifier of the first data piece accords with the identifier of the third data piece or the identifier of a data piece in a lower hierarchical level than the third data piece.

7. The data structure determining method as set forth in claim 6, further comprising the steps of:

determining whether or not there is a data piece can have a data piece in a lower hierarchical level in the same hierarchical level as the third data piece when the third data piece can not have the fourth data piece; and determining that the infinite hierarchical structure does not take place when there is no data piece that can have a data piece in a lower hierarchical level.

8. A data structure determining apparatus for hierarchically structured data comprised of two or more data pieces having a hierarchical relationship, comprising:

data storing means for storing a data piece that has an identifier and that is an element of the hierarchically structured data; and processing means for determining whether or not there are two or more data pieces with the same identifier in a hierarchical data sequence comprising a first data piece and a second data piece placed below the first data piece, by retrieving data pieces in different hierarchical levels and comparing identifiers of the data pieces in the different hierarchical levels, and determining that an infinite hierarchical structure takes place when there are two or more data pieces with the same identifier if the second data piece is placed below the first data piece.

9. The data structure determining apparatus as set forth in claim 8,
  wherein said data storing means is adapted for correlating management information including at least one of a parent pointer and a child pointer with a data piece that is an element of the hierarchically structured data and storing the resultant data piece, and
  wherein said processing means is adapted for determining whether or not there are two or more data pieces with the same identifier in the hierarchical data sequence with reference to the management information.

10. The data structure determining apparatus as set forth in claim 8,
  wherein said processing means is adapted for not placing the second data piece below the first data piece when said processing means has determined that an infinite hierarchical structure takes place, and for placing the second data piece below the first data piece when said processing means has determined that an infinite hierarchical structure does not take place.

11. The data structure determining apparatus as set forth in claim 8, further comprising:
  input/output means for prompting a user whether or not the second data piece should be placed below the first data piece and receiving a reply from the user when said processing means has determined that an infinite hierarchical structure takes place.

12. The data structure determining apparatus as set forth in claim 11,
  wherein said processing means is adapted for not placing the second data piece below the first data piece when said input/output means has received a reply that represents the user has not permitted a data placement, and for placing the second data piece below the first data piece when said input/output means has received a reply that represents the user has permitted the data placement.

13. The data structure determining apparatus as set forth in claim 8,
  wherein said processing means is adapted for determining whether or not an identifier of the second data piece accords with an identifier of the first data piece or an identifier of a data piece in a higher hierarchical level than the first data piece and determining that an infinite hierarchical structure takes place when the identifier of the second data accords with the identifier of the first data piece or the identifier of a data piece in a higher hierarchical level than the first data piece.

14. The data structure determining apparatus as set forth in claim 13,
  wherein said data storing means is adapted for correlating management information including a parent pointer with a data piece that is an element of the hierarchically structure data and storing a resultant data piece, and
  wherein said processing means is adapted for determining whether or not the identifier of the second data piece accords with the identifier of the first data piece or the identifier of a data piece in a higher hierarchical level than the first data piece with reference to the management information.

15. The data structure determining apparatus as set forth in claim 8,
  wherein said processing means is adapted for determining whether or not an identifier of the first data piece accords with an identifier of the second data piece or an identifier of a data piece in a lower hierarchical level than the second data piece determining that an infinite hierarchical structure takes place when the identifier of the first data piece accords with the identifier of the second data piece or the identifier of a data piece in a lower hierarchical level than the second data piece.

16. The data structure determining apparatus as set forth in claim 14,
  wherein said data storing means is adapted for correlating management information including a child pointer with a data piece that is an element of the hierarchically structure data and storing a resultant data piece, and
  wherein said processing means is adapted for determining whether or not the identifier of the first data piece accords with the identifier of the second data piece or the identifier of a data piece in a lower hierarchical level than the second data piece.

17. A data structure determining method for hierarchically structured data including two or more data pieces having a hierarchical relationship, comprising the steps of:
  determining that an infinite hierarchial structure takes place when there are two or more same data pieces in a hierarchical data sequence in which a data piece is newly placed, by retrieving data pieces in different hierarchical levels and comparing the data pieces in the different hierarchical levels; and
  determining that an infinite hierarchical structure does not take place when there are not the same data pieces in the hierarchical data sequence in which the data piece is placed.

18. The data structure determining method as set forth in claim 17, further comprising the steps of:
  prohibiting the data piece from being newly placed in the hierarchical data sequence when it has been determined that an infinite hierarchical structure takes place; and
  permitting the data pieces to be newly placed in the hierarchical data sequence when it has been determined that an infinite hierarchical structure does not take place.

19. A method for managing hierarchically structured data pieces including a destination data piece having a corresponding destination identifier, comprising the steps of:
  adding a new identifier to a new data piece placed in a hierarchical level of a hierarchical sequence different from the destination data piece;
  determining whether the destination data piece can have a lower hierarchical structure;
  retrieving and comparing the destination data piece and the new data piece; and
  adding the new data piece to the lower hierarchical structure of the destination data piece, if the new identifier is different from the destination identifier.

20. The data structure determining method as set forth in claim 19, further comprising the steps of:
  determining that an infinite hierarchical structure takes place when there are two or more data pieces with the same identifier if the new data piece is placed below the destination data piece; and
  determining that an infinite hierarchical structure does not take place when there are not two or more data pieces with the same identifier even if the new data piece is placed below the destination data piece.

21. A method for structuring data pieces as elements of hierarchically structured data, including a first data piece positioned in a first hierarchical level of a hierarchical data sequence, and a second data piece positioned in a second hierarchical level of the hierarchical data sequence different from the first hierarchical level, comprising the steps of:

retrieving and comparing the first data piece and the second data piece; and determining that an infinite hierarchical structure takes place when the first data piece is the same as the second data piece.

* * * * *